Nov. 21, 1961  R. C. ROLAND  3,009,520
SOIL MULCHING IMPLEMENT
Filed Oct. 14, 1957
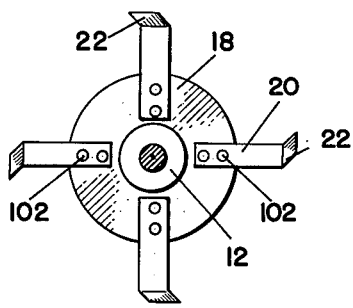
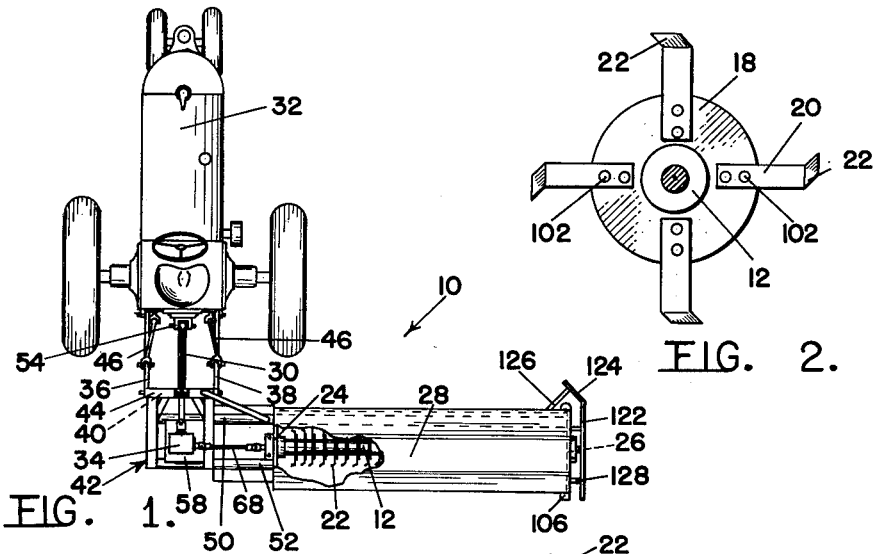
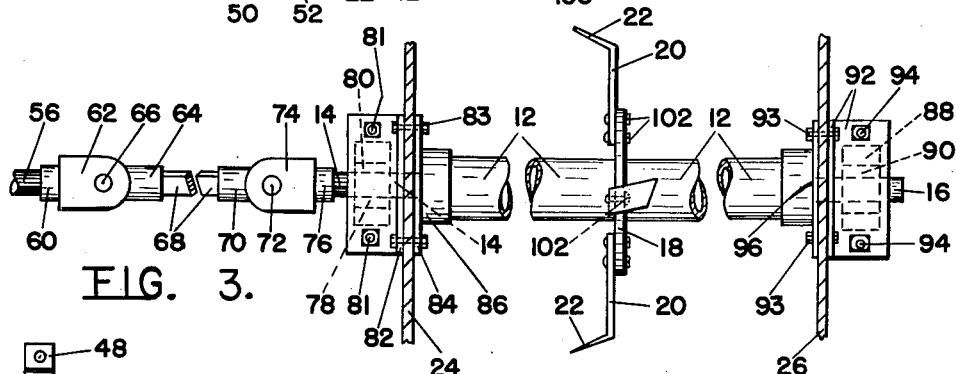
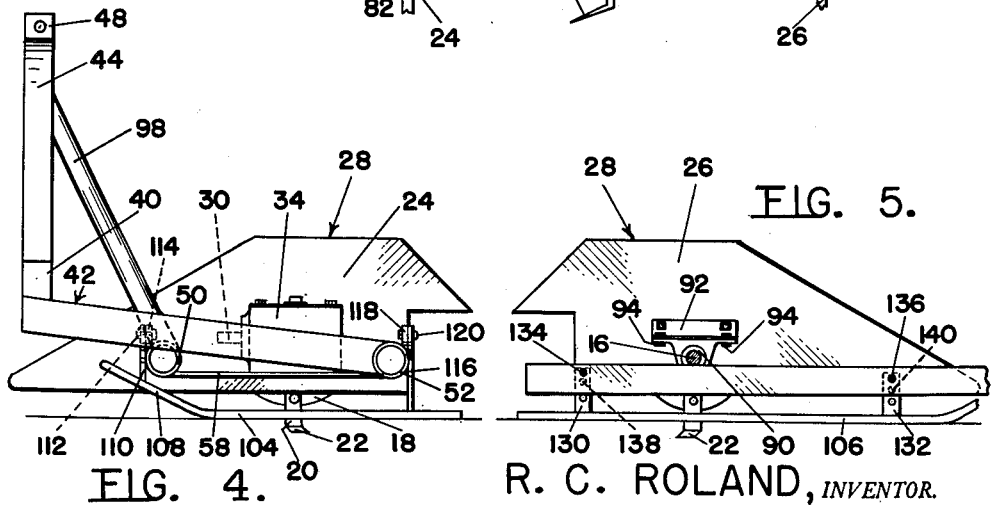
R. C. ROLAND, INVENTOR.

United States Patent Office 3,009,520
Patented Nov. 21, 1961

3,009,520
SOIL MULCHING IMPLEMENT
Richard C. Roland, Box 631, La Feria, Tex.
Filed Oct. 14, 1957, Ser. No. 689,936
1 Claim. (Cl. 172—78)

This invention relates to farm implements or attachments of the type designed to be mounted on a tractor, and in particular a reel or sleeve having radially disposed knives carried by discs mounted thereon positioned on a transversely disposed shaft extended from one side of a tractor, carried by skids and operatively connected to a power take-off of the tractor whereby upon forward travel of the tractor the knives, which are formed with angularly disposed cutting edges, dig into the soil cutting roots and removing grass and weeds, whereby the soil particularly around fruit trees and the like is reduced to a mulch.

The purpose of this invention is to provide an attachment for a tractor by which grass, weeds, roots, and the like may be reduced to a mulch around fruit trees and the like.

Various types of attachments have been provided for use on tractors and many of such devices are designed for working the soil, however, because branches of trees spread over relatively large areas it is difficult to work the soil under the branches and close to the trunks of the trees without damaging the trees. With this thought in mind this invention contemplates a digging attachment for a tractor wherein soil working elements extend laterally from one side of the tractor so that soil below the branches of trees may be worked from a tractor spaced from ends of the branches.

The object of this invention is, therefore, to provide an attachment for a tractor by which soil below branches of trees may be reduced to a mulch without damaging branches of the trees.

Another object of the invention is to provide a soil working attachment extended from a side of a tractor in which penetration of soil working elements thereof is adjustable.

Another important object of the invention is to provide a soil mulching attachment for use on a tractor in which soil penetrating elements thereof are actuated by the power take-off of the tractor.

It is yet another object of the invention to provide a mulching attachment designed to be mounted on and extended from one side of a tractor in which the penetration of soil digging elements thereof into the ground is controlled by skids.

A further object of the invention is to provide a soil mulching attachment for a tractor which extends from one side of the tractor in which the attachment may readily be mounted on different types of tractors.

A still further object of the invention is to provide a soil mulching implement for use on a tractor, and which extends from one side of the tractor, in which the implement is of a simple and economical construction.

With these and other objects and advantages in view the invention embodies a transversely disposed shaft rotatably mounted in a housing positioned on skids with discs having radially disposed knives extended therefrom positioned in spaced relation on the shaft, and with the shaft connected by universal joints to a stub shaft extended from the power take-off of a tractor whereby with forward movement of the tractor the knives dig into the soil cutting grass, weeds, and roots and reducing the soil to a mulch.

Other features and advantages of the invention will appear from the following description taken in connection with the drawings, wherein:

FIGURE 1 is a plan view showing a tractor with the soil mulching attachment mounted thereon and with part of the housing of the attachment broken away to show the mulching knives therein.

FIGURE 2 is a cross section through the shaft on which the mulching knives are positioned showing a plurality of radially disposed knives carried by a disc mounted on the shaft and with other parts of the attachment omitted, the parts being shown on an enlarged scale.

FIGURE 3 is a plan view of the shaft also with the parts shown on an enlarged scale and with parts broken away showing one of the mulching knives, the bearings by which the shaft is mounted in the housing, and also the universal joints in the portion of the shaft connected to the power take-off of a tractor.

FIGURE 4 is an end elevational view of the housing in which the mulching knives are positioned looking toward the end that is attached to a tractor and showing the attaching elements.

FIGURE 5 is an end elevational view of the housing looking toward the end opposite to the end shown in FIGURE 4.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a tubular shaft having inner and outer stub shafts 14 and 16 extended from the ends, numeral 18 discs upon which radially disposed knives 20 with angularly positioned ends 22 are positioned, numeral 24 an inner end plate and numeral 26 an outer end plate of a housing having a cover plate 28, and numeral 30 a stub shaft connecting the power take-off of a tractor 32 to the mulching element through a gear casing 34.

The mulching element is suspended from a tractor by a three-point suspension hitch having rearwardly extending pivot bars 36 and 38 connected to the ends of a cross bar 40 at the forward end of a frame 42. A vertically disposed A-frame 44 is rigidly secured to the ends of the said cross bar 40 of the frame 42. Lift bars 46 are disposed angularly, the upper ends being connected to the lift mechanism of the tractor, and the lower ends being pivotally secured to the pivot bars 36 and 38 at a point adjacent the frame 42. The apex 48 of the A-frame 44 is formed into a clevis, and has connected thereto a further lift bar, the opposite end of which is secured to the tractor lifting mechanism.

The frame 42 further consists of a pair of tubular metal tubes 50 and 52, which extend transversely, the forward tube 50 being disposed through the end plate 24 and abutted against and welded to the end plate 26. The rear tube 52 is abutted against and welded to the end plate 24.

The forward end of the stub shaft 30 is connected to the power take-off 54 of the tractor and the opposite end extends into the gear casing 3 4through which the stub shaft is connected to a splined shaft 56 by bevel gears or the like. The gear casing is mounted on the upper surface of a support plate 58, which is welded to the underside of the pipes 50 and 52 of the frame 42, and the splined shaft 56 extends into a hub 60 of a universal joint having a yoke 62 with a knuckle 64 pivotally mounted therein by a pin 66. The hub of the knuckle 64 is provided with an opening having flat sides and a shaft 68 having corresponding flat sides is positioned in the opening. The opposite end of the shaft is positioned in a similar opening, also having flat sides, in a hub 70 of a knuckle of a universal joint in which the hub is secured by a pin 72 in a yoke 74. A hub 76 of the yoke 74 is also provided with a splined opening into which the splined end of the stub shaft 14 extends, as shown in FIGURE 3.

The stub shaft 14 is rotatably mounted in a casing 78 by a bearing 80 and the casing is suspended from an angle bar 82 by bolts 81 and the angle bar is secured to the end plate 24 by bolts 83 that also extend through a flange 84 of a guard 86. The stub shaft 16 at the opposite end is also mounted in a casing 88 by a bearing 90, and the casing is suspended from an angle bar 92 that is secured to the end plate 26 by bolts 93, by the bolts 94, and the bolts 93 also extend through a plate 96 on the inner surface of the end plate 26. The cover plate 28 is supported by the end plates 26 and 24. The guards prevent grass, weeds, and the like working into the bearings through openings in the end plates.

A tubular support bar 98 is secured at its upper end to the A-frame 44, and the lower end is welded to the tubular pipe 50 of the frame 42.

The discs 18 are mounted by welding or the like to the tubular shaft 12. The knives 20 are secured to the discs by fasteners, such as the rivets 102. The ends 22 of the knives extend in opposite directions, as shown in FIGURE 3, and with the leading edges sharp roots will be cut and grass and weeds worked from the soil.

The housing in which the cutting elements are positioned is mounted on skids or runners 104 and 106. The skid 106 is adjustably connected to the end plate 26 to provide means for adjusting the depth the knives penetrate into the soil. The skid 104, shown in FIGURE 4, is provided with an upwardly inclined leading end 108 from which bars 110 extend, and the bars are secured by bolts 112 to tabs 114 extended from the tubular pipe 50. The tabs 114 are provided with a plurality of openings positioned to receive the bolts to provide adjustments for regulating the distance the knives extend into the soil. The trailing end of the skid is provided with similar bars 116 that are secured to the tabs 118 by bolts 120, and the tabs 118 are provided with a plurality of bolt holes which also provide adjustment for the elevation of the skid. The tabs 114 and 118 and the bars 110 and 116 are spaced apart for the four-corner support of the substantially square-shaped skid 104.

The extended end of the housing is provided with a guard rail 122 with an inwardly extended forward end 124 and the end 124 is supported by a brace 126. The rail 122 is secured into position on the end plate on suitable spacers 128, and bars 130 and 132, which extend upwardly from the skid 106, are secured to the end plate 26 by bolts 134 and 136, which also secure the rail 122 to the end plate 26. The skid 106 is constructed relatively narrow, needing but one pair of bars for support. The said bars 130 and 132 are provided with spaced openings 138 and 140 which provide adjustment to regulate the penetration of the knives into the soil at the outer end of the cutter assembly.

*Operation*

With the mulching attachment assembled and mounted on a tractor as illustrated and described and with the cutting elements or knives operatively connected to the power take-off of the tractor the device is drawn around a fruit tree or the like with the mulching housing extended into the trunk of the tree or below the branches thereof, and with the knives rotating the oppositely disposed tips or inclined ends dig into the soil cutting roots and removing grass and weeds whereby a mulch is formed around the trees. By this means the ground around fruit trees and the like may be broken at regular periods or as desired and the branches of the trees will not be damaged.

The penetration of the knives into the soil is readily regulated by adjusting the positions of the skids, and the knives may be removed and sharpened or replaced, as desired.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will acomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts usch as come within the purview of the invention claimed may be resorted to in actual practice, if desired.

Having now described the invention that which is claimed to be new and desired to be procured by Letters Patent is:

In a soil mulching implement, the combination which comprises an elongated forward tube, a rectangular-shaped frame having a cross bar extended across the leading end mounted on one end of the forward tube, means for connecting the rectangular-shaped frame to a tractor, a gear casing mounted on said rectangular-shaped frame, a stub shaft extended forwardly from the gear casing, means for connecting the stub shaft to the power take-off of said tractor, spaced inner and outer end plates extended transversely of said forward tube, said forward tube extending through the inner end plate and abutting the outer end plate, said end plates being welded to the forward tube, a rear tube positioned across the rear of said rectangular-shaped frame and abutting said inner end plate, a tubular shaft extended between the inner and outer end plates, inner and outer stub shafts extended from ends of the tubular shaft, bearings positioned on the end plates and in which the stub shafts are mounted, said inner stub shaft having a universal joint on the extended end, a shaft having flat sides extended from said universal joint, another universal joint connecting the shaft having flat sides to said gear case for driving said tubular shaft, spaced discs having radially disposed knives with angular positioned cutting ends mounted on said tubular shaft, a cover plate mounted on said end plates and extended over the cutting knives, runners mounted on the end plates and depending therefrom, and a guard suspended from and mounted on said outer end plate, said elongated forward tube providing a rigid supporting element extending throughout the length of the implement.

References Cited in the file of this patent

UNITED STATES PATENTS

| | | |
|---|---|---|
| 1,729,073 | Johnston | Sept. 24, 1929 |
| 2,552,710 | Dobson | May 15, 1951 |
| 2,771,829 | Sahlbom | Nov. 27, 1956 |
| 2,775,855 | Richey | Jan. 1, 1957 |
| 2,865,160 | Farwell | Dec. 23, 1958 |

FOREIGN PATENTS

| | | |
|---|---|---|
| 167,268 | Australia | Mar. 19, 1956 |
| 1,114,058 | France | Dec. 12, 1955 |